Patented Nov. 14, 1950

2,529,514

UNITED STATES PATENT OFFICE 2,529,514

METHOD OF VACUUM PACKING FOOD PRODUCTS UNDER AGITATION

Howell L. Roberts, Maywood, and Peter Sognefest, Broadview, Ill., assignors to American Can Company, New York, N. Y., a corporation of New Jersey No Drawing. Application August 8, 1947, Serial No. 767,664

15 Claims. (Cl. 99—214)

The present invention has for its object the provision of a novel and improved method of packing and processing in sheet metal containers a variety of succulent vegetables and other food products so as to provide the ultimate consumer with canned vegetables which come closer to garden fresh, home cooked vegetables as regards natural color, flavor, texture, nutritive values and vitamin contents than has heretofore been possible by the use of conventional methods of packing.

More particularly, the invention comprises the use of a new combination of processing steps and principles such as filling into sheet metal containers prepared vegetable solids with a canning brine, juice, sauce, syrup or other suitable canning or flavoring liquid of an amount sufficient to effect rapid heat penetration in the filled containers, but insufficient to appreciably absorb or extract color, flavor and nutritive values from the vegetable, hermetically sealing the filled containers under a comparatively high vacuum and heat processing the filled and sealed containers under suitable agitation.

This new and cooperatively interacting combination of method steps has produced canned vegetables such as peas, cut green beans, diced beets, diced carrots, yellow corn, white corn, lima beans and mixed vegetables which are of surprisingly outstanding quality as compared with canned vegetables packed under the old conventional methods and is believed to also have application to dried vegetables, seeds, fruits and a variety of other food products.

The old or conventional methods of packing which are herein contrasted with the present invention include brine packing and vacuum packing with "still" processing.

In full brine packing, the solid particles of vegetables or other food products in the container are usually completely immersed in a sterilizing brine bath which fills all interstices and consitutes a comparatively large percentage of the contents of the container. The short comings and disadvantages of vegetable and other food packs which contain a large percentage of brine or other canning liquid are well known. The brine which fills all the space between solid vegetable particles during processing and storage of the container extracts and dissolves from the vegetable many of its natural ingredients including flavoring principles, inorganic salts, coloring matter and important vitamin and other nutritive elements. This valuable liquid, which is excessively present in the conventional brine pack, is customarily poured from the can by the consumer and thrown away. Also the brine has deleterious effects on the texture and color of the remaining vegetable solids, usually unduly softening, mushing and bleaching them.

The vacuum packing method is an improvement upon the full brine packing method and is disclosed in F. F. Fitzgerald Patent 1,803,605 of May 5, 1931. While the Fitzgerald method produces a product superior in color, flavor and retention of nutritive values over the brine pack method and is in extensive use at present, it has the serious disadvantage of requiring, since the still processing method is used in connection therewith, a comparatively long processing time because the presence of only a small amount of canning liquid or moisture and the presence of void spaces retards heat penetration and sterilizes the contents unevenly, resulting in discoloration and overcooking of the more delicate succulent vegetables, such as whole kernel corn, especially white corn, which has not been successfully canned by the still vacuum process. As far as has been ascertainable, the Fitzgerald process has been heretofore always used as a "still" process, i. e. the filled and vacuum sealed containers were not agitated during the processing period.

The present invention has been surprisingly successful in overcoming the difficulties and shortcomings of the described old methods of canning by the use of proper agitation during heat processing, by the use of relatively high vacuum in the hermetic sealing and by the use of the proper amount of canning liquid.

It is believed that the surprising results of the present invention are primarily due to controlled use of rapid heat transference through agitation, high vacuum and predetermined amount of canning liquid and the present invention has therefore been designated as the "Agitating-Vacuum Process."

The method of heat transfer in full brine packed products is quite different from that in vacuum packed foods. Foods in full brine are heated mainly by convection and the rate of heat transfer is rapid. This would be an advantage if it were not offset by the disadvantages hereinbefore set forth in connection with full brine packing.

When the "still" process vacuum pack method is used void spaces exist between the individual particles due to the small amount of brine or other canning liquid used and the transfer of heat occurs through vaporization and condensation of the small amount of brine or other canning liquid in the can. Use of a high closing vacuum aids ready vaporization at comparatively low temperatures. The hot vapor then circulates through the container, gives off its heat to the cooler food particles and is condensed. The condensate in turn flows to the hot surface of the can and there completes the hot vapor cycle by being vaporized again. As the temperature inside the can increases the rate of heat transfer becomes progressively slower. The retarded rate of heat transfer at higher temperatures makes it necessary to use longer processing time for vacuum packed foods than for the same foods packed in full brine. For example, No. 2 cans (307 x 409) brine packed with whole kernel corn are commonly processed for 25 minutes at 250 degrees F. while the same vacuum packed corn in smaller so-called 12 oz. cans (307 x 306) requires 35 minutes at 250 degrees F. when the still process vacuum pack method is used. The relatively longer sterilizing time required in the still process vacuum pack method tends to offset the quality advantage obtained by using only a small amount of brine. For example, white varieties of corn are darkened and caramelized to such an extent by the long vacuum process that they have never been successfully packed until the present invention came into use.

The present inventors, after extensive experiments and tests with all kinds of succulent vegetables, especially whole kernel corn, both yellow and white varieties, discovered that accelerated heat transfer by means of proper agitation of the filled and vacuum sealed containers during heat processing produced surprisingly new and favorable results. Their theory is that to the hot vapor cycle on the interior of the container hereinbefore described in connection with the "still" process vacuum pack is added a hot liquid cycle by means of proper agitation. This new combination is obtained when the cans are agitated or rotated in such a manner that the hot liquid because of agitation and because of the void space provided by the restricted amount of canning liquid is caused to continually trickle, spill or splash over the food particles, lose its heat to the food particles thereby uniformly heating them and to again become reheated through contact with the hot walls of the can. This agitation or rotation of the can results in much faster and more uniform heat penetration than that which obtains in the Fitzgerald process or in a process which depends on mere natural convection in the liquid contents without outside agitation. As the can or container is agitated or rotated the hot canning liquid from the heated can walls continues to trickle, spill or splash through the void spaces over all discrete particles of the vegetable or other food product and the temperature in all parts of the can is made substantially equal to the external steam or other sterilizing medium within the surprisingly short space of time of a few minutes.

In order to prove this combined hot vapor-hot liquid cycle theory, laboratory tests were made which showed that an amazingly rapid rate of heating resulted when vacuum packed whole kernel corn was agitated during processing. This permitted a major reduction in the time required for safe processing, which in turn yielded canned corn of exceptionally high quality as regards color, flavor, texture and vitamin contents. These preliminary tests were then supplemented and corroborated by field tests wherein a batch cooker of a type which is commonly used in the evaporated milk industry was fitted with suitable can holding cages so that the test cans could be rotated during processing. The apparatus was regulated so that the cage could be rotated at the desired speed and the temperatures of the can contents could be measured during both still and agitated processes. Heat penetration tests were made on vacuum packed peas, cut green beans, diced beets, diced carrots, Silver Cross corn, Golden Cross corn, Country Gentlemen corn, lima beans and mixed vegetables. The types of agitation which were studied and which greatly increased the rate of heat penetration are as follows:

1. Continuous end-over-end rotation.
2. Continuous axial rotation.
3. Intermittent axial rotation.

The first two types of rotation may be readily obtained in the batch type of cooker commonly used commercially for evaporated milk by so placing the filled and vacuumized cans in the revolving reel that they will be agitated either end-over-end or about their longitudinal axes.

Tests involving end-over-end agitation have indicated that the rate of heat penetration is most satisfactory in the speed of rotation range of 10 to 50 revolutions per minute. It was found that intermittent axial rotation also gave satisfactory results. This type of rotation is produced on cans by the conventional continuous horizontal pressure cooker of the agitating type. In this type of cooker the cans are carried along the outside of a revolving drum or reel.

During rotation of the reel the cans roll against a spiral guide fastened to the inside of the shell. Thus, the cans are supported by the reel when on the upper approximate half of the reel rotation cycle and by the shell when on the lower approximate half of the reel rotation cycle. During the lower approximate half of the reel rotation cycle the cans are subject to a rolling motion, whereas on the upper approximate half they are carried by the reel without being subject to rotation about their own axes.

In these cookers the speed of rotation is controlled by the speed of the reel which, in turn, is governed by the length of process required. Numerous tests have indicated that end-over-end and continuous axial rotation produce essentially the same rate of heating in any one product. Intermittent axial rotation produces slightly slower heat penetration. While these are preferred methods of agitation other forms of continuous or intermittent agitation may give satisfactory results.

The results of these tests are exemplified and summarized in the following table:

[Relative process requirements for vacuum packed vegetables—still vs. agitated cooks (307 x 400 cans) (307 x 306 cans).]

| Product | Type Agitation | Calculated Process Time at 250° F. |
|---|---|---|
| | | *Minutes* |
| Sweet Peas | end-over-end | 10 |
| | continuous axial | 10 |
| | intermittent axial | 13 |
| | none-still cook | 20 |
| Corn | end-over-end | 12 |
| | continuous axial | 12 |
| | intermittent axial | 14 |
| | none-still cook | 35 |

For larger size cans in which corn is usually packed, the results of the above tests are exemplified and summarized in the following table:

[Relative process requirements of vacuum packed corn in 603 x 408 cans—still vs. agitated cooks.]

| Type of Agitation | Calculated Process Time at 250° F. |
|---|---|
| | Minutes |
| End-over-end | 17 |
| Continuous axial | 17 |
| None-still cook | 55 |

These tables show that the processing time of the herein described invention has been greatly reduced and is only from 34 to 65 percent of the processing time consumed by the old conventional methods of packing or a relative saving of 66 to 35 percent in the time factor. This constitutes an important economy in commercial packing of foods, especially succulent vegetables.

The time reduction of the thermal process which is accomplished in the Agitating-Vacuum procedure permits an important quality improvement. Natural colored, attractive vegetables are obtained which have a very pleasing appearance. The improved color of whole kernel Agitating-Vacuum corn is particularly impressive. The improvement is most striking to young tender corn which contains a high ratio of sugar to starch. The darkening which occurs during conventional processing is decreased so markedly during the short Agitating-Vacuum process, that the product has the appearance and taste of freshly cooked corn.

As was previously mentioned, the white varieties of corn have never been successfully vacuum packed because of the excessive darkening and caramelizing of the corn that occurred during processing in the conventional manner. However, these varieties when canned by the Agitating-Vacuum process have a pleasing, natural color.

Most vacuum packed vegetables are canned in 307 x 306 or 307 x 400 cans, but corn is also vacuum packed in 603 x 408 cans. As the can size and, naturally, the length of the conventional process increases, the outer portions of the corn become darker. Thus, there exists an appreciable color difference within a single can of still processed vacuum picked corn. The corn at the can center has a reasonably good color while the corn at the can walls appear dark and dull. However, a bright color, uniform throughout the can, is obtained when corn in the large can is processed in accordance with the present invention. With 51 ounce fill of corn, a conventional process of 55 minutes at 250 degree F. is usually required to sterilize the product. Approximately the same degree of sterility results from 17 minutes at 250 degrees F. when the can is agitated during processing.

Beets and carrots benefited with respect to color by agitated processing. Some observers have also been impressed with the superior quality of cut green beans given the agitated can process. Whereas the seeds of still processed beans had browned, the seeds of the agitated processed beans remained green.

After it was discovered that the Agitating-Vacuum process reduced the processing time and produced superior color and flavor in vegetables, especially in corn, studies and tests were undertaken to determine and effect on vitamin retention. The thiamine vitamin was chosen for study and test since it is known to be unstable to heat imposed during thermal processing. Niacin vitamin was included in the tests because prior studies have shown this vitamin to be relatively stable to heat.

Using the continuous axial or end-over-end type of agitation, a comparison was made between the thiamine and niacin retentions resulting from this type of agitated processing of corn and the retentions obtained in the conventional still process for vacuum pack corn. This comparative test showed conclusively that niacin retention in vacuum packed corn by either method of processing is uniformly high, being slightly higher in the agitating vacuum process. However, the agitating-vacuum process technique results in distinctly higher retentions of thiamine. The corn processed by the agitated method contained from about 40 to 50 percent more thiamine than samples processed by the conventional still methods. This higher thiamine retention may be attributed to the fact that in the practice of the present invention the ratio of the rate of thermal destruction of the vitamin to the rate of thermal destruction of food spoilage microorganisms is more favorable to thiamine retention than is the similar ratio in conventional processing.

The degree of vacuum used in the practice of the present invention should be as high as possible, preferably from 25" of mercury up, but satisfactory results with some food products may be obtained at from 20" to 25" of mercury. It is believed that satisfactory results are not obtainable below 20" of vacuum.

The processing temperatures applicable in the practice of the present invention are from about 240 degrees F. to 270 degrees F., varying with different food products.

The amount of liquid brine, syrup, juice, sauce or other suitable canning liquid again varies somewhat with different vegetables or other food products. The experiments and tests conducted in developing the present invention showed that from 7% to 22% of canning liquid based on full container volume, without head space, was found to be the proper percentage range for a wide variety of products, including those specifically mentioned herein.

Summarizing briefly the essential method steps of the present invention: The vegetable or other food product, suitably prepared, is placed in the can or container with a predetermined amount of brine or other suitable canning liquid as hereinbefore described, a vacuum is then produced in the container which is somewhere in the range of 20" to 29" of mercury and the container is closed hermetically while the interior is under the desired vacuum. The sealed container is then heat processed by any suitable heating medium such as steam, while being agitated as hereinbefore described for the greatly reduced heating period previously mentioned.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

We claim:

1. The method of packing vegetables and similar food products in hermetically sealed containers so as to preserve their color, flavor, texture, nutritive value and vitamin contents in improved condition, which consists in filling the product in the container with a quantity of canning liquid representing about 7% to 22% of full container volume to create hot sterilizing vapor and hot sterilizing liquid to effect rapid heat penetration when the container is heated and agitated but being insufficient to fill to an appreciable extent void spaces between the product particles and insufficient to appreciably extract color, flavor and nutritive values from the food product, hermetically sealing said container under a relatively high vacuum, then heat processing the sealed container to heat said vapor and canning liquid to a sterilizing temperature, and agitating said container during the processing period to cause the heated liquid to flow in the void spaces and over all of the product surfaces.

2. The method of packing vegetables and similar food products in sheet metal containers so as to preserve their color, flavor, texture, nutritive value and vitamine contents in improved condition, which consists in filling the product in the container with a predetermined quantity of canning liquid sufficient to effect rapid heat penetration when the container is agitated but insufficient to fill to an appreciable extent void spaces between the product particles and insufficient to appreciably extract color, flavor and nutritive values from the food product, hermetically sealing said container under a relatively high vacuum, then heat processing the sealed container, and agitating said container during the processing period to cause the heated liquid to flow in the void spaces and over all of the product surfaces, said predetermined quantity of canning liquid representing about 7% to 22% of full container volume.

3. The method of packing vegetables and similar food products in hermetically sealed containers so as to preserve their color, flavor, texture, nutritive value and vitamin contents in improved condition, which consists in filling the product in the container with a quantity of canning liquid representing about 7% to 22% of full container volume to create hot sterilizing vapor and hot sterilizing liquid to effect rapid heat penetration when the container is heated and agitated but being insufficient to fill to an appreciable extent void spaces between the product particles and insufficient to appreciably extract color, flavor and nutritive values from the food product, hermetically sealing said container under a relatively high vacuum, then heat processing the sealed container to heat said vapor and canning liquid to a sterilizing temperature, and continuously agitating said container during the processing period to cause the heated liquid to flow in the void spaces and over all of the product surfaces.

4. The method of packing vegetables and similar food products in hermetically sealed containers so as to preserve their color, flavor, texture, nutritive value and vitamine contents in improved condition, which consists in filling the product in the container with a quantity of canning liquid representing about 7% to 22% of full container volume to create hot sterilizing vapor and hot sterilizing liquid to effect rapid heat penetration when the container is heated and agitated but being insufficient to fill to an appreciable extent void spaces between the product particles and insufficient to appreciably extract color, flavor and nutritive values from the food product, hermetically sealing said container under a relatively high vacuum, then heat processing the sealed container to heat said vapor and canning liquid to a sterilizing temperature, and intermittently agitating said container during the processing period to cause the heated liquid to flow in the void spaces and over all of the product surfaces.

5. The method of packing vegetables and similar food products in hermetically sealed containers so as to preserve their color, flavor, texture, nutritive value and vitamin contents in improved condition, which consists in filling the product in the container with a quantity of canning liquid representing about 7% to 22% of full container volume to create hot sterilizing vapor and hot sterilizing liquid to effect rapid heat penetration when the container is heated and agitated but being insufficient to fill to an appreciable extent void spaces between the product particles and insufficient to appreciably extract color, flavor and nutritive values from the food product, hermetically sealing said container under a relatively high vacuum, then heat processing the sealed container to heat said vapor and canning liquid to a sterilizing temperature, and agitating said container at the rate of from about 10 to 50 revolutions per minute during the processing period to cause the heated liquid to flow in the void spaces and over all of the product surfaces.

6. The method of packing vegetables and similar food products in hermetically sealed containers so as to preserve their color, flavor, texture, nutritive value and vitamin contents in improved condition, which consists in filling the product in the container with a quantity of canning liquid representing about 7% to 22% of full container volume to create hot sterilizing vapor and hot sterilizing liquid to effect rapid heat penetration when the container is heated and agitated but being insufficient to fill to an appreciable extent void spaces between the product particles and insufficient to appreciably extract color, flavor and nutritive values from the food product, hermetically sealing said container under a relatively high vacuum, then heat processing the sealed container at between about 240 and 270 degrees F. to heat said vapor and canning liquid to a sterilizing temperature, and agitating said container during the processing period to cause the heated liquid to flow in the void spaces and over all of the product surfaces.

7. The method of packing vegetables and similar food products in hermetically sealed containers so as to preserve their color, flavor, texture, nutritive value and vitamin contents in improved condition, which consists in filling the product in the container with a quantity of canning liquid representing about 7% to 22% of full container volume to create hot sterilizing vapor and hot sterilizing liquid to effect rapid heat penetration when the container is heated and agitated but being insufficient to fill to an appreciable extent void spaces between the product particles and insufficient to appreciably extract color, flavor and nutritive values from the food product, hermetically sealing said container under a relatively high vacuum, then heat processing the sealed container having a 17.1 fluid ounce capacity for about 10 to 14 minutes at between about 240 to 270 degrees F. to heat said vapor and canning liquid to a sterilizing temperature, and agitating said containers during the processing period to cause the heated liquid to flow in the void spaces and over all of the product surfaces.

8. The method of packing vegetables and similar food products in hermetically sealed containers so as to preserve their color, flavor, texture, nutritive value and vitamin contents in improved condition, which consists in filling the product in the container with a quantity of canning liquid representing about 7% to 22% of full container volume to create hot sterilizing vapor and hot sterilizing liquid to effect rapid heat penetration when the container is heated and agitated but being insufficient to fill to an appreciable extent void spaces between the product particles and insufficient to appreciably extract color, flavor and nutritive values from the food product, hermetically sealing said container under a relatively high vacuum, then heat processing the sealed containers at between about 240 to 270 degrees F. to heat said vapor and canning liquid to a sterilizing temperature, and agitating said containers at the rate of at least 10 revolutions per minute during the processing period to cause the heated liquid to flow in the void spaces and over all of the product surfaces.

9. The method of packing vegetables and similar food products in hermetically sealed containers so as to preserve their color, flavor, texture, nutritive value and vitamin contents in improved condition, which consists in filling the product in the container with a quantity of canning liquid representing about 7% to 22% of full container volume to create hot sterilizing vapor and hot sterilizing liquid to effect rapid heat penetration when the container is heated and agitated but being insufficient to fill to an appreciable extent void spaces between the product particles and insufficient to appreciably extract color, flavor and nutritive values from the food product, hermetically sealing said container under a vacuum of at least 20" of mercury, then heat processing the sealed containers to heat said vapor and canning liquid to a sterilizing temperature, and agitating said containers during the processing period to cause the heated liquid to flow in the void spaces and over all of the product surfaces.

10. The method of packing vegetables and similar food products in hermetically sealed containers so as to preserve their color, flavor, texture, nutritive value and vitamin contents in improved condition, which consists in filling the product in the container with a quantity of canning liquid representing about 7% to 22% of full container volume to create hot sterilizing vapor and hot sterilizing liquid to effect rapid heat penetration when the container is heated and agitated but being insufficient to fill to an appreciable extent void spaces between the product particles and insufficient to appreciably extract color, flavor and nutritive values from the food product, hermetically sealing said container under a vacuum of between 20" and 29" of mercury, then heat processing the sealed containers to heat said vapor and canning liquid to a sterilizing temperature, and agitating said containers during the processing period to cause the heated liquid to flow in the void spaces and over all of the product surfaces.

11. The method of packing vegetables and similar food products in hermetically sealed containers so as to preserve their color, flavor, texture, nutritive value and vitamin contents in improved condition, which consists in filling the product in the container with a quantity of canning liquid representing about 7% to 22% of full container volume to create hot sterilizing vapor and hot sterilizing liquid to effect rapid heat penetration when the container is heated and agitated but being insufficient to fill to an appreciable extent void spaces between the product particles and insufficient to appreciably extract color, flavor and nutritive values from the food product, hermetically sealing said container under a vacuum of between about 25" and 29" of mercury, then heat processing the sealed container to heat said vapor and canning liquid to a sterilizing temperature, and agitating said containers during the processing period to cause the heated liquid to flow in the void spaces and over all of the product surfaces.

12. The method of packing vegetables and similar food products in sheet metal containers so as to preserve their color, flavor, texture, nutritive value and vitamin contents in improved condition, which consists in filling the product in the container with a canning liquid representing about 7% to 22% of the full container volume being insufficient to fill to an appreciable extent void spaces between the product particles, hermetically sealing said container under a relatively high vacuum, heat processing the sealed container for converting said canning liquid into a hot sterilizing vapor and a hot sterilizing liquid, and agitating said container during the heat processing period thereby causing said hot sterilizing vapor and hot sterilizing liquid to continuously play over said product surfaces in said void spaces in sufficient volume for effecting rapid and uniform heat penetration but insufficient to appreciably extract color, flavor and nutritive values from the product for minimizing the processing period.

13. The method of packing vegetables and similar food products in hermetically sealed containers so as to preserve their color, flavor, texture, nutritive value and vitamin contents in improved condition, which consists in filling the product in the container with a quantity of canning liquid representing about 7% to 22% of full container volume to create hot sterilizing vapor and hot sterilizing liquid to effect rapid heat penetration when the container is heated and agitated but being insufficient to fill to an appreciable extent void spaces between the product particles and insufficient to appreciably extract color, flavor and nutritive values from the food product, hermetically sealing said container under a relatively high vacuum, then heat processing to heat said vapor and canning liquid to a sterilizing temperature, and agitating the sealed container for a time corresponding to approximately one third to one half of that required to sterilize the still processed vacuum packed product at the same temperature to cause the heated liquid to flow in the void spaces and over all of the product surfaces.

14. The method of packing vegetables and similar food products in hermetically sealed containers so as to preserve their color, flavor, texture, nutritive value and vitamin contents in improved condition, which consists in filling the product in the container with a quantity of canning liquid representing about 7% to 22% of full container volume to create hot sterilizing vapor and hot sterilizing liquid to effect rapid heat penetration when the container is heated and agitated but being insufficient to fill to an appreciable extent void spaces between the product particles and insufficient to appreciably extract color, flavor and nutritive values from the food product, hermetically sealing said container under a relatively high vacuum, then heat processing to heat said vapor and canning liquid to a sterilizing temperature, and agitating the sealed container for a time corresponding to approximately one half to two thirds of that required to sterilize the still processed brine packed product at the same temperature to cause the heated liquid to flow in the void spaces and over all of the product surfaces.

15. The method of packing vegetables and similar food products in hermetically sealed containers so as to preserve their color, flavor, texture, nutritive value and vitamin contents in improved condition, which consists in filling the product in the container with a quantity of canning liquid representing about 7% to 22% of full container volume to create hot sterilizing vapor and hot sterilizing liquid to effect rapid heat penetration when the container is heated and agitated but being insufficient to fill to an appreciable extent void spaces between the product particles and insufficient to appreciably extract color, flavor and nutritive values from the food product, hermetically sealing said container under a relatively high vacuum, then heat processing to heat said vapor and canning liquid to a sterilizing temperature, and agitating the sealed container for a time corresponding to approximately 34% to 65% of that required to sterilize the unagitated container at the same temperature to cause the heated liquid to flow in the void spaces and over all of the product surfaces.

HOWELL L. ROBERTS.
PETER SOGNEFEST.

REFERENCES CITED

The following references are of record in the file of this patent:

UNITED STATES PATENTS

| Number | Name | Date |
|---|---|---|
| 1,365,928 | Logan et al. | Jan. 18, 1921 |
| 1,474,820 | Hansen | Sept. 27, 1921 |
| 1,803,605 | Fitzgerald | May 5, 1931 |